Jan. 23, 1951

E. B. SNYDER 2,539,375

RADIO FREQUENCY BAR SEALER AND
CONTROL APPARATUS THEREFOR

Filed Nov. 21, 1947

WITNESS

N. Leszczak

INVENTOR
Ellsworth B. Snyder
BY

William P. Stewart

ATTORNEY

Jan. 23, 1951  E. B. SNYDER  2,539,375
RADIO FREQUENCY BAR SEALER AND
CONTROL APPARATUS THEREFOR

Filed Nov. 21, 1947  5 Sheets-Sheet 2

INVENTOR
Ellsworth B. Snyder
BY William P. Stewart
ATTORNEY

WITNESS
N. Leszczak

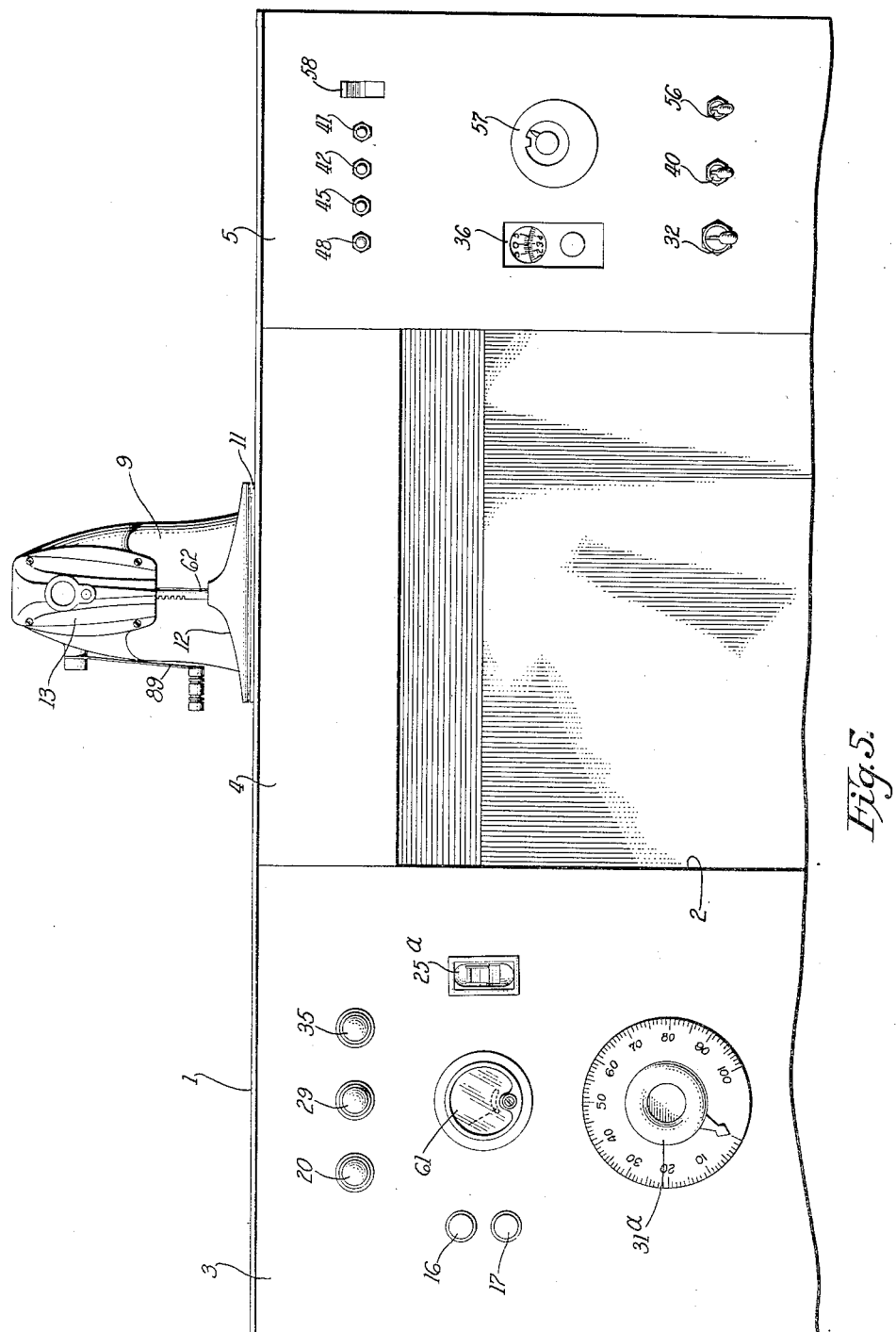

Patented Jan. 23, 1951

2,539,375

UNITED STATES PATENT OFFICE 2,539,375

RADIO-FREQUENCY BAR SEALER AND CONTROL APPARATUS THEREFOR

Ellsworth B. Snyder, Somerville, N. J., assignor to The Singer Manufacturing Company, Elizabeth, N. J., a corporation of New Jersey Application November 21, 1947, Serial No. 787,308

8 Claims. (Cl. 219—47)

This invention relates to apparatus commercially known as bar sealers and employed for sealing or bonding dielectric materials by means of electric fields at radio frequencies and is more particularly concerned with an improved arrangement of the parts and with a control system which provides high production rates with uniformity of product.

The essential parts of a bar sealer of this type may conveniently be segregated into the machine head, the power supply rectifier, the oscillator, and the control equipment.

In general, the controls require frequent manipulation and must be placed conveniently close to the operator.

It has been customary with bar sealers of this type to build and supply the separate units which then are interconnected electrically to form the complete bar sealer. This resulted in the inefficient use of materials with resultant high cost as well as in the inherent bad placement of essential controls remote from the operator with loss of effective operation resulting therefrom. A further disadvantage of the separate unit arrangement of the prior art lies in the fact that the radio-frequency transmission line is exposed and becomes the source of interference radiation.

An object of this invention, therefore, is to provide a complete bar sealing unit with built-in rectifier, oscillator, driving motor and controls, the only necessary external connections being to the regular electrical supply lines, for complete operation of the unit. Another object of the invention is to provide a unitary structure for mounting the machine head and for housing the controls including the rectifier and oscillator.

A still further object of this invention is to provide a system of controls for a bar sealer to render it completely automatic, semi-automatic, or completely hand operative, selectively at the will of the operator.

Another object of this invention is to provide a functional arrangement of the component parts which will minimize radiation effects and bring the controls naturally and easily within the range of the operator.

These objects are attained in the present invention by means of a special console-type steel cabinet designed to provide a central kneehole portion, compartments for housing rectifier, oscillator and control elements and to afford a support for a machine head mounted on a portion bridging said kneehole portion, with control handles projecting through the front of said compartments.

With the above and other objects in view, as will hereinafter appear, the invention comprises the devices, combinations and arrangements of parts hereinafter set forth and illustrated in the accompanying drawings of a preferred embodiment of the invention, from which the features thereof and the advantages attained thereby will be readily understood by those skilled in the art.

In the accompanying drawings:

Fig. 5 is a fragmentary front elevational view of the bar sealer of Fig. 1 showing the relative panel arrangement of the control elements.

Figure 1:
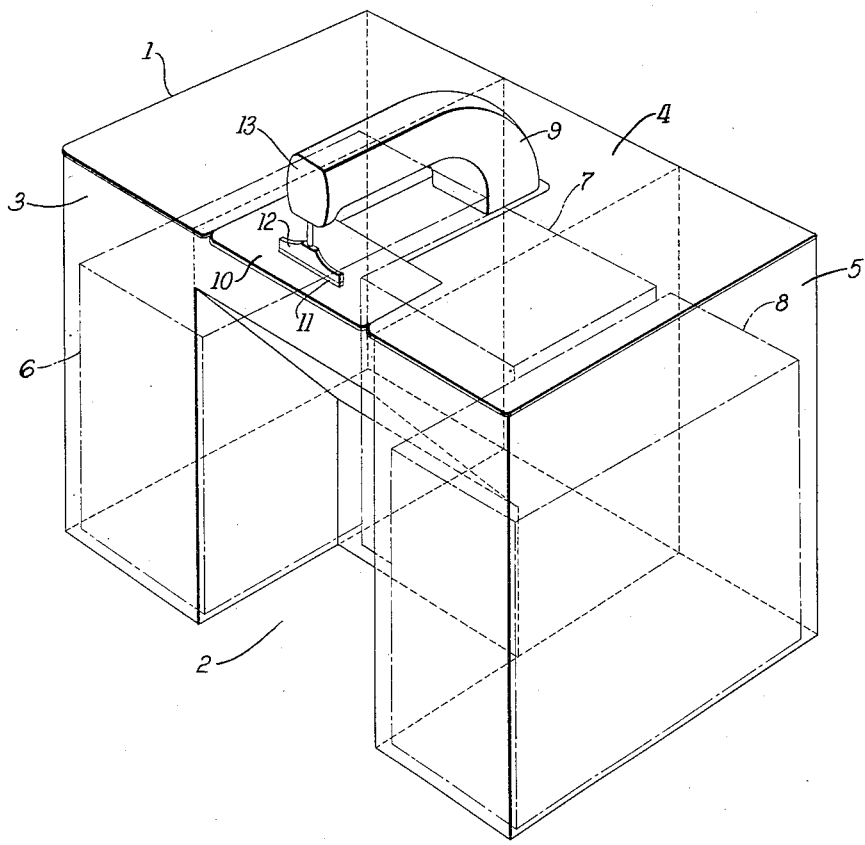
Fig. 1 is a perspective view of a bar sealer embodying the invention.

Referring now to Fig. 1, the bar sealer comprises a desk-like enclosure 1 with a kneehole portion 2. This naturally provides three compartments, comprising compartments 3 and 5 at opposite sides of the kneehole portion 2 and compartment 4 disposed rearwardly of said portion. Preferably, but not necessarily, a power supply rectifier 6 is housed within the left compartment 3; an oscillator 7 within the rear compartment 4; and control elements 8 within the right compartment 5.

Mounted on the top of the rear compartment 4 is a machine head comprising an overhanging arm 9, a bed 10, a fixed lower electrode 11, mounted on the bed, and an upper electrode 12, arranged to be reciprocated vertically in a head 13 of the arm 9.

The arrangement is such as to bring the oscillator 7 as close to the electrode 11 as possible, thereby reducing to a minimum the necessary length of the transmission line carrying currents of radio frequency. This compact arrangement, when added to the fact that the transmission line is wholly within the metallic shielding influence of the compartment 4, reduces the strength of any external radiation field so that little, if any, radio interference is caused by the unit.

It will be understood that 6 indicates the equipment associated with the rectifier unit, including transformers, chokes, condensers, resistors and tubes, 7 denotes the equipment associated with the oscillator, including tubes, resistors, condensers, grid coil and plate coil, while 8 refers to control equipment, including relays, contactors, switches and timers. The specific rectifier and oscillator units per se form no part of the present invention and so will not be described herein. However, they may be of the type set forth and described in the U. S. Patent No. 2,453,680.

Figure 2:
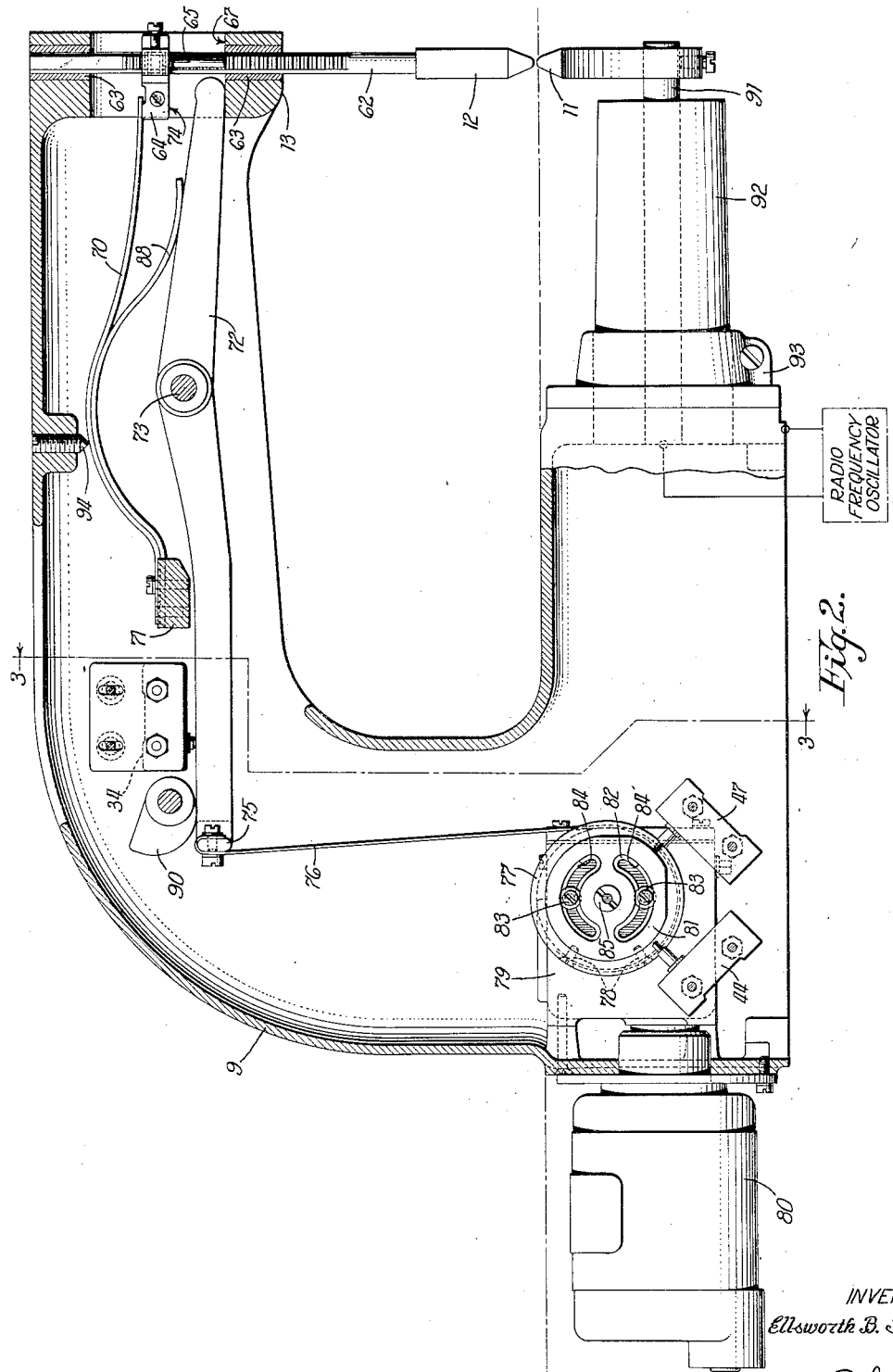
Fig. 2 is a longitudinal sectional view, partly in elevation, taken through the overhanging arm of the machine of Fig. 1.

As shown best in Fig. 2, an electrode bar 62, carrying the upper electrode 12, is journaled in bearings 63—63 for vertical reciprocation in the head 13. A block 64, carrying a stop-pin 65, is adjustably mounted on the bar 62, said stop-pin 65 being disposed to engage a surface 67 of the head 13, thereby limiting downward movement of the bar 62.

A leaf spring 70, secured to a frame-boss 71, exerts a downward pressure upon the block 64 and provides a constant biasing force tending to hold the electrode 12 in its down or bonding position. A lifter lever 72 is pivoted about an axis 73 secured to the arm 9 and is adapted at one end to engage the under side 74 of the block 64 and to raise the electrode 12 against the constant spring bias. At the opposite end, the lever 72 is provided with an arm 75 to one end of which a flexible steel band 76 is attached. This steel band is wrapped partly around a pulley 77 and is secured thereto by screws 78. Thus it will be seen that, if limited forward and backward rotation is imparted to the pulley 77, the electrode 12 will be raised and lowered accordingly. The pulley 77 is driven through a gear box 79 by an electric motor 80. The limit switches 44 and 47, operated by cams 81 and 82, secured to said pulley 77, provide for limit reversing of the motor 80, thus producing at the pulley the desired limited forward and backward rotation. That is to say, when the high spot of each cam engages the respective switch, the motor is either turned off or reversed.

Figure 3:
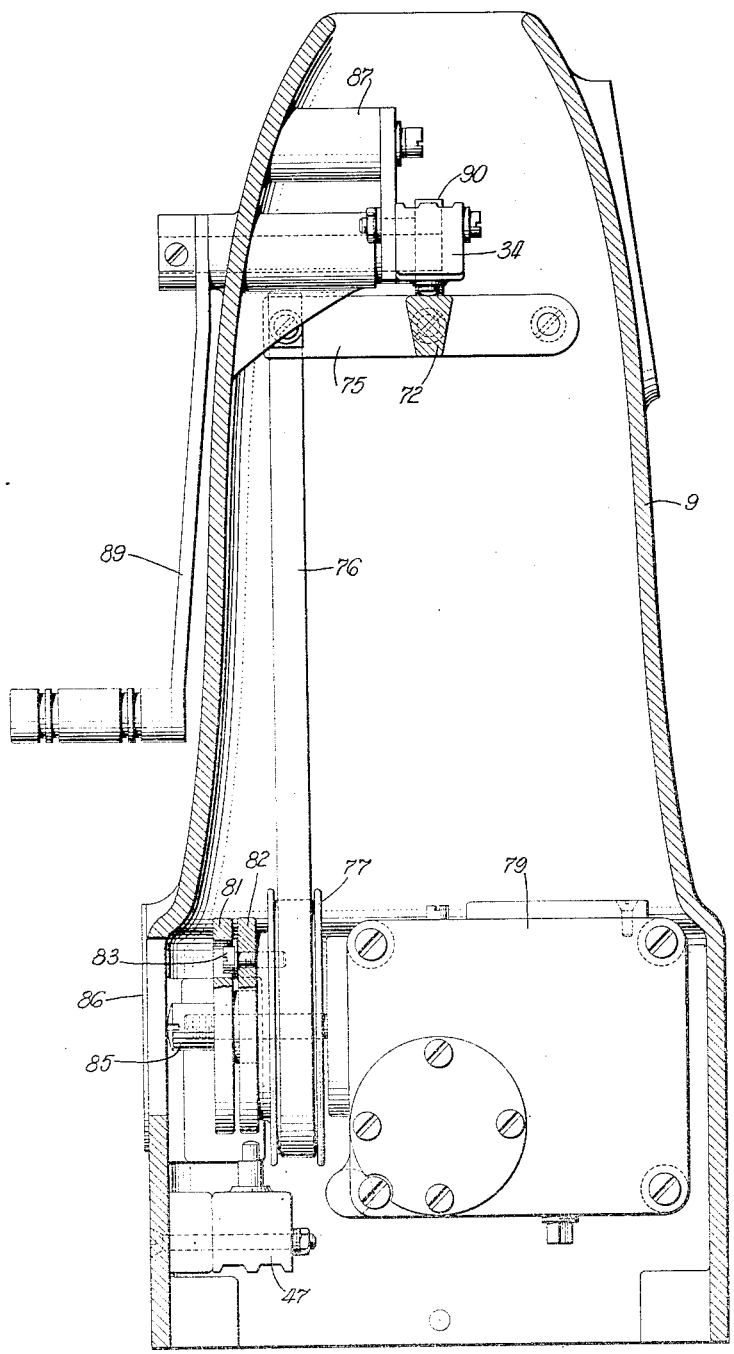
Fig. 3 is a transverse sectional view, partly in elevation, taken approximately on the line 3—3 of Fig. 2.

As will be seen best in Fig. 3, the cams 81 and 82 are each adjustably secured to the pulley 77 so that the travel of said pulley may be closely set. The rear cam 82 is secured to the pulley 77 by means of screws 83 which are reached for adjustment through peripheral slots 84 in the front cam. The front cam 83 is secured to the pulley 77 by means of the single cap screw 85. These screws are accessible from the outside by removing a cover 86.

Secured to a boss 87 inside the arm 9 is a limit switch 34 which governs the turning on and off of the oscillator as will be described presently. It is desirable that the oscillator be turned on and off while the electrode 12 is in its fully seated lower position. This action is secured by providing lost motion in the lifter lever 72 so that it can move a short distance even after the electrode 12 is seated in its down position. A spring 88 secured to the boss 71 applies a bias force to the lever 72, which force continues to move said lever even after the electrode 12 is seated and until the end of the lever 72 is stopped by the inside surface 67 of the head 13. This additional movement of the arm is just sufficient to operate the switch 34.

A hand-crank 89, journaled in the arm 9 operates a cam 90 to move the lifter lever 72 independently of the motor drive, in cases of emergency.

The lower or insulated electrode 11 is clamped to a conducting stud 91 fixed in a cylindrical block of resistance material 92 which is, in turn, secured to the arm 9 by means of a clamping ring 93. Electrical connections are made from the oscillator to the stud 91 and to the machine frame thus applying radio-frequency voltage to the electrodes 11 and 12. A screw 94 tapped into the arm is used to adjust the pressure exerted by the springs 70 and 88.

The control system embodied in this invention provides push-buttons and switches at the operator's position for instantaneous selection of the operating condition and includes preset cycling controls with adjustable timing. Basically, the system is designed around a continuous operating cycle in which the operator merely loads and unloads the machine. This cycle comprises the following steps, (1) the upper electrode descends and clamps the work between it and the lower electrode, (2) the oscillator is turned on, (3) after a predetermined time, the oscillator is turned off, (4) the upper electrode remains down for a predetermined dwell time, and (5) the upper electrode returns to its raised position, thus completing the cycle. It is provided that this cycle be repeated automatically or at the will of the operator. The dwell time (4) may be omitted entirely from this cycle to suit the needs of the work in hand by merely operating a switch or push-button.

If the operator wishes to reject the work, a push-button may be operated to raise the electrode so that the work may be removed or readjusted. There is a manual position provided, in which case the electrode may be operated by hand to the desired position, as for example, when initially adjusting the electrodes for register. The motor 80 is provided which does the work of raising and lowering the electrode 12 under the guidance of the control system as will now be described.

Figure 4:
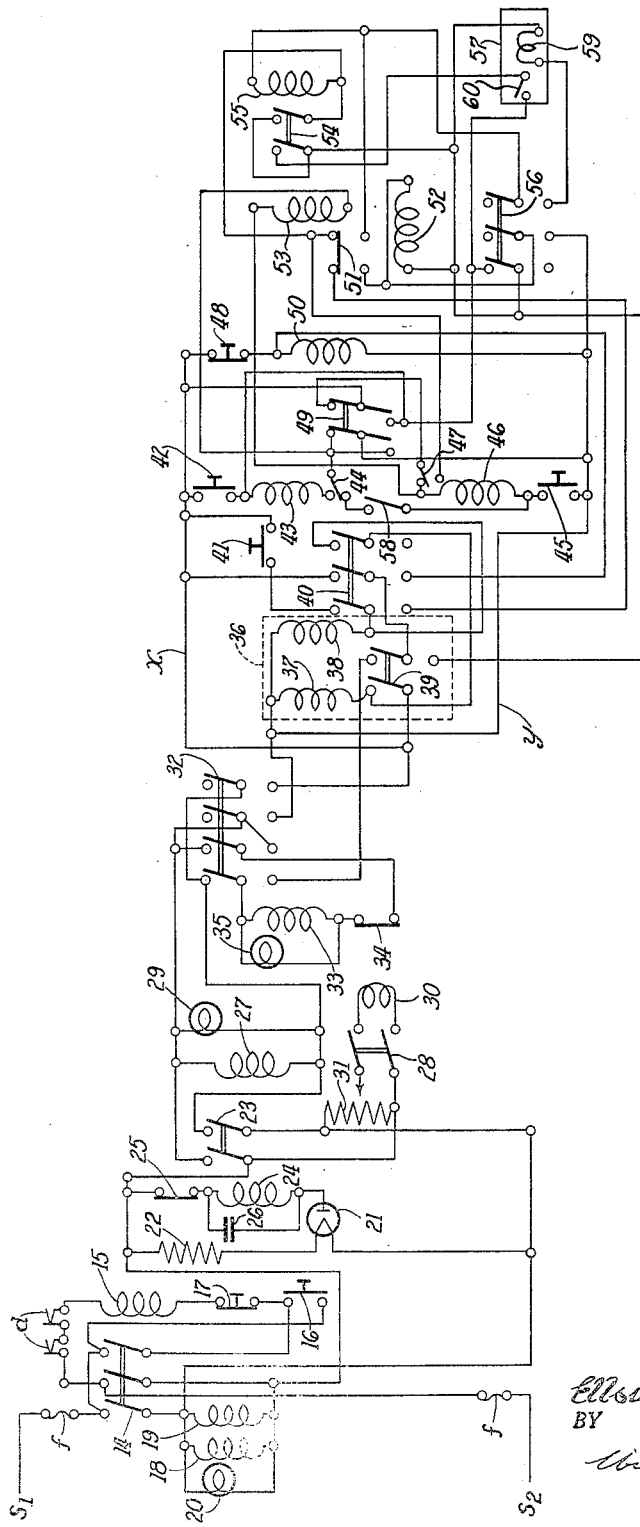
Fig. 4 is a schematic wiring diagram showing the electrical relation between the control elements.

Referring to Fig. 4, $S_1$ and $S_2$ are the supply lines which form the sole source of energy supply for the control and operation of the bar sealer. Line fuses $f$—$f$ protect the entire circuit, and safety door switches $d$ prevent the application of any power internally while a door is open. A start and stop contactor 14, having a coil 15, is controlled by start push-button 16 and stop push-button 17 to connect a rectifier filament transformer 18 and an oscillator filament transformer 19 to the source of voltage $S_1$—$S_2$. An indicating lamp 20 lights to signal that this connection has been made. The customary back contacts on the contactor 14 maintain the coil 15 energized when push-button 16 is released from its momentary closure.

Closure of the contactor 14 also puts voltage on the filament of a rectifier tube 21 through a voltage dropping resistor 22. A relay 23 has its coil 24 connected in the plate circuit of the rectifier tube 21 and in series with an oscillator overload switch 25. A filter condenser 26 shunts the relay coil 24.

Closure of the relay 23 energizes coil 27 to close its associated relay 28 and signal lamp 29 is lighted. The relay 28 connects a transformer 30 to a voltage control transformer 31 which has been previously energized by closure of the contactor 14. The transformer 30 supplies voltage to the plates of the rectifier tubes.

A four-pole double-throw switch 32, in its upper closed position, connects a relay coil 33 across the supply voltage through a limit switch 34. This relay coil 33 controls a relay which connects the cathode circuit of the oscillator to ground and thus renders the oscillator productive of radio-frequency energy to the bonding electrodes. The limit switch 34 is closed only when the upper electrode is lowered into its bonding position. An indicating lamp 35 shows when the electrodes are in bonding condition. This upper position of the switch 32 is called the "manual" position and, in such position, the upper electrode may be hand-cranked to and from the bonding position, the oscillator remaining on so long as the electrode is in a position to close the limit switch 34.

The lower closed position of the switch 32 is called the "control" position and, as will be seen presently, in this position, the electrode operation is under push-button or limit-switch control and the oscillator is under the control of a timer. A timer unit 36 has a motor winding 37, a clutch coil 38, and a contactor 39. This timer controls the length of time the oscillator supplies radio-frequency energy to the load, as will be apparent presently. A three-pole double-throw switch 40 has an upper closed position called a "momentary" position and a downward closed position called an "automatic" position. The following elements will be identified and later described as to their function in the circuit: momentary push-button 41, motor up push-button 42, motor up relay coil 43, motor up limit-switch 44, motor down push-button 45, motor down relay coil 46, motor down limit-switch 47, reject push-button 48, reject relay 49, reject relay coil 50, selector relay 51, selector relay unlock coil 52, selector relay operating coil 53, locking relay 54, locking relay coil 55, dwell no-dwell switch 56, dwell timer 57, and automatic switch 58.

The motor 60 employed to drive the upper electrode may be a capacitor type permanent-split low-inertia motor and reversing is accomplished electrically by means of a conventional circuit having reversing relays which operate to reverse the voltage on the capacitor-phase winding, as is well known. The reversing relays are controlled respectively by the motor up relay coil 43 and the motor down relay coil 46 and it is sufficient for this discussion to state that, when coil 43 is energized, the motor drives the electrode up and when coil 46 is energized, the motor drives the electrode down.

The motor is provided with limit switches 44 and 47. Switch 44 is shown in its position when the electrode reaches its extreme upward position. Under all other conditions, the switch 44 is in its up position. Similarly, switch 47 is normally in the position shown but goes to its down postion only when the electrode is in its extreme down position.

Reject relay 49 is shown in its unexcited position and goes to its other position when coil 40 is excited. Selector relay 51 is shown in its normal position and goes to its other position when coil 52 is excited. However, this relay can then be restored to its normal position only by exciting winding 53 momentarily.

Locking relay 54 is shown in its normal unexcited position and goes to its other or closed position when coil 55 is excited.

*Operation*

Let us assume that full automatic cycling operation is desired. Switch 32 is thrown to its lower position and switch 40 is thrown to its lower position. Assuming that contactor 14 has been closed, closure of relay 23 connects $S_1$ to line $x$, and $S_2$ to line $y$. Automatic switch 58 is closed and the coil 46 is energized through the reject relay 49. The motor 60 drives the electrode downward until, in the extreme position, limit switch 47 operates to open the circuit to the coil 46 and stop the motor. Further, operation of the switch 47 also establishes a circuit through relay 51 and clutch coil 38, which closes contactor 39 in its up position. This starts the timer 36 by excitation of the motor winding 37 and, at the same time, applies voltage to the relay coil 33 which picks up the oscillator relay, thus establishing a radio-frequency voltage at the electrodes and bonding begins. After a time determined by the setting of the timer 36, the clutch is released and contactor 39 is thrown to its lower position. This stops the timer motor and releases the oscillator relay by cutting off current to the coil 33, thus turning off the oscillator.

If the dwell, no-dwell switch 56 is in its up or "no dwell" position the motor up relay coil 43 is excited immediately through the following circuit: from $x$ through reject button 48, switch 40, contactor 39, switch 56, up motor coil 43, limit switch 44, reject relay 49 to $y$. Thus, at the end of the bonding period, the motor drives the electrode up and releases the work which is then removed or readjusted by the operator.

When the electrode reaches its top position, limit switch 43 goes to its down position, opens the circuit through the motor up relay coil, and establishes the following circuit through the motor down relay coil 46: from $y$ through reject relay 49, switch 43, switch 58, coil 46, switch 47, reject relay 49 to $x$. This causes reversal of the motor and the cycle is repeated continuously as above described.

If, however, it is desired to have the electrode remain down and hold pressure on the work even after the oscillator is turned off, switch 56 is thrown to its down or dwell position. In this case, when timer contactor 39 goes to its down position to turn off the oscillator, the following circuit is established: from $x$ through push-button 48, switch 40, contactor 39, unlocking coil 52, and switch 56 to $y$. This causes closure of relay 51 to its down position and establishes the following circuit: from $x$ through push-button 48, switch 40, contactor 39, motor coil 59, switch 56, lower contacts of relay 51, switch 56 to $y$. Also the following circuit is established: $y$ through switch 56, relay 51, coil 55, switch 47, relay 49 to $x$. This closes relay 54. This starts dwell timer 57 and, after a time determined by the setting of this timer, contactor 60 closes and establishes the following circuit: from $x$ through push-button 48, switch 40, contactor 39, relay 54, contactor 60, motor up relay coil 43, limit switch 44, reject relay 49 to $y$. This causes the motor to drive the electrode up until the limit switch 44 is closed to its down position. This cycle will then repeat continuously as above described. Closure of limit switch 47 to its up position establishes the following circuit: from $x$ through reject relay 49, switch 47, coil 53, reject relay 49 to $y$. This closes relay 51 to its up position and deenergizes coil 55 which opens relay 54 taking voltage off the dwell timer 57 and returning it to normal condition.

It will be seen that operation of relay 51 to its lower position removes voltage from clutch coil 38 of the timer 36 and thus restores said timer to normal condition.

Operation of the reject button 48 removes excitation from the coil 50 causing closure of relay 49 to its other position. This interchanges the motor up and motor down relay coils and thus reverses the motor.

It will be seen that closure of the automatic switch 58 is necessary to the continuous automatic cycling operation. If switch 58 is left open, the operation is initiated by pushing button 45 which excites coil 46 and causes the motor to drive the electrode downward and all the sequence of events described above under automatic control will take place until the electrode reaches its top position where it is stopped by operation of limit switch 44. This single cycle operation is especially useful where the loading time is not uniform, as it allows the operator to start the cycle whenever she is ready.

Thus, by the various switching operations, the operator may select the different bonding conditions of continuous cycling, single cycling, reject, or manual control and may adjust the bonding time and/or the dwell time to any value desired. Each bond is thus duplicated with extreme accuracy, leaving only the loading and unloading as necessary functions of the operator.

By referring to Fig. 5, it will be seen that arranged on the front panel of compartment 1 are signal lights 28, 29, and 35, start push-button 16, stop push-button 17, reset button 25a for the oscillator overload switch 25, control knob 31a for the variable transformer 31 and a milliammeter 61 for indicating the direct current to the oscillator plate circuit.

On the front panel of the compartment 5 are located the three double-throw switches 32, 40 and 56, the bonding timer 36, the dwell timer 57, the push-buttons 41, 42, 45 and 48, and the switch 58. The front of the middle compartment is kept clear of any apparatus so as to present no obstructions to the operator in handling the work between the electrodes 11 and 12.

It will be seen from the above that there has been provided an assemblage of parts within a unitary enclosure affording a convenient support for a bonding machine head, while also serving as an effective shield for stray radio-frequency fields, allowing the operator to be positioned most advantageously relative to the work and within convenient reach of all essential controls.

Having thus set forth the nature of the invention, what I claim herein is:

1. In a bar sealer for sealing bondable material, oscillator means for generating radio-frequency energy, electrodes for applying said energy and pressure to said bondable material, a motor for relatively moving said electrodes into and out of bonding position, means responsive to a predetermined electrode position for turning on said oscillator, means responsive to a predetermined elapsed bonding time for turning off said oscillator, means for controlling said motor to separate said electrodes at the end of a predetermined elapsed time after said oscillator is turned off, and selective switch means for presetting the motor control means to continuously repeat each operating cycle or to stop at the conclusion of each cycle.

2. A machine for making heat seals in dielectric materials by applying thereto pressure and a radio-frequency field, comprising electrodes, motor means for relatively moving said electrodes, oscillator means for generating a radio-frequency voltage, conductor means for applying said voltage to said electrodes to establish said radio-frequency field, means responsive to the position of said electrodes for turning on said oscillator means, first timer means for turning off said oscillator means after the lapse of a predetermined time, and second timer means for starting said motor means a predetermined time after said oscillator is turned off.

3. In a bar sealer for sealing dielectric material by the application thereto of pressure and a radio-frequency field, electrodes for applying said field and said pressure, an oscillator for supplying said field, control means including means for turning on said oscillator in a predetermined position of said electrodes, means for turning off said oscillator at the end of a predetermined time interval, means for moving said electrodes out of pressure-applying position a predetermined time after turning off said oscillator, and selective means for repeating said cycle of operations continuously and for stopping them at the completion of one cycle.

4. A control system for a bar sealer having a radio-frequency oscillator connected to separable electrodes, comprising means for selectively establishing a single operating cycle or a series of cycles, and means for preventing further operation at any selected point in any cycle, each cycle including the relative movement of said electrodes to bonding position, the turning on of said oscillator responsive to the position of said electrodes, the turning off of said oscillator responsive to elapsed time, and the movement of said electrodes out of bonding position a predetermined time after the oscillator is turned off.

5. In a bar sealer having relatively movable electrodes connected to a radio-frequency oscillator for providing pressure and a radio-frequency field for sealing dielectric materials, control means for establishing a predetermined working cycle for making each seal, switch means for selecting either a single cycle or a continuous group of cycles, and means for stopping said operation at any selected point of any cycle.

6. In an apparatus for sealing dielectric materials by the application thereto of pressure and a radio-frequency field, an oscillator, relatively movable electrodes connected to said oscillator, said electrodes being spring biased to a closed position, a lifter lever for raising one electrode against said spring bias, an electric motor, a pulley driven by said motor, a band wrapped around said pulley and operatively connected to said lifter lever, cams secured to said pulley, and switches disposed for operation by said cams and controlling said motor to impart to said pulley limited forward and reverse rotation, whereby said one electrode is raised and lowered.

7. In an apparatus for sealing dielectric materials, relatively movable electrodes, said electrodes being spring biased to a closed position, and means for separating said electrodes by applying forces opposed to said spring bias force, said means including a lifter lever, a pulley connected by a band to said lifter lever, a motor driving said pulley, cams secured to rotate with said pulley, and switches operated by said cams for controlling said motor to wind and unwind said band on said pulley, whereby said lifter lever is operated to apply said forces opposed to the spring bias force.

8. In a bar sealer, a movable electrode, a fixed electrode, spring biasing means for urging said movable electrode towards said fixed electrode, lifter means for raising said movable electrode away from said fixed electrode, an electric motor, a pulley driven by said motor, a band wrapped around said pulley and connected to said lifter means, cams connected for rotation with said pulley, and switches operated by said cams for controlling said motor, whereby said pulley winds and unwinds said band to impart a raising and a lowering movement to said lifter means to raise and lower said movable electrode.

ELLSWORTH B. SNYDER.

REFERENCES CITED

The following references are of record in the file of this patent:

UNITED STATES PATENTS

| Number | Name | Date |
|---|---|---|
| 2,340,510 | Corley | Feb. 1, 1944 |
| 2,401,991 | Walton | June 11, 1946 |
| 2,442,451 | Albin | June 1, 1948 |
| 2,460,460 | Langer | Feb. 1, 1949 |
| 2,487,432 | Fuge | Nov. 8, 1949 |

OTHER REFERENCES

"Radio Sealing," Wireless World, January 1945, page 29.